US011122500B2

(12) United States Patent
Salgueiro et al.

(10) Patent No.: US 11,122,500 B2
(45) Date of Patent: Sep. 14, 2021

(54) USING A BLOCKCHAIN FOR OPTIMIZED FAST-SECURE ROAMING ON WLANS

(71) Applicant: Cisco Technology, Inc., San Jose, CA (US)

(72) Inventors: Gonzalo Salgueiro, Raleigh, NC (US); Shankar Ramanathan, Richardson, TX (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 5 days.

(21) Appl. No.: 15/872,081

(22) Filed: Jan. 16, 2018

(65) Prior Publication Data

US 2019/0223089 A1 Jul. 18, 2019

(51) Int. Cl.
*H04W 48/14* (2009.01)
*H04W 48/20* (2009.01)
(Continued)

(52) U.S. Cl.
CPC .......... *H04W 48/14* (2013.01); *G06F 16/951* (2019.01); *H04L 9/0637* (2013.01); *H04W 48/20* (2013.01); *H04L 63/06* (2013.01); *H04L 63/0892* (2013.01); *H04L 63/101* (2013.01); *H04L 2209/38* (2013.01); *H04W 12/04* (2013.01); *H04W 12/06* (2013.01); *H04W 12/08* (2013.01);
(Continued)

(58) Field of Classification Search
CPC ....... H04W 48/14; H04W 48/00; H04W 8/00; H04W 60/00; H04W 36/0033; H04W 36/0038; H04W 36/0055; H04W 12/06; H04W 12/08; H04W 84/12; H04W 12/04; H04W 88/02; H04W 48/20; H04W 88/08; H04L 9/3239; H04L 9/0637; H04L 2209/38; H04L 63/101; H04L 63/06; H04L 63/0892; H04L 9/3297; H04L 2209/80; Y04S 40/20; G06F 16/951
USPC .............................................. 370/338
See application file for complete search history.

(56) References Cited

U.S. PATENT DOCUMENTS 5,862,345 A * 1/1999 Okanoue ................ H04L 61/20
709/238
6,633,761 B1 * 10/2003 Singhal ............. H04L 29/12009
370/331
(Continued)

OTHER PUBLICATIONS https://www.cisco.com/c/en/us/support/docs/wireless-mobility/wireless-1 . . . ; 802.11 WLAN Roaming and Fast-Secure Roaming on CUWN—Cisco; pp. 1-39.

*Primary Examiner* — Jeffrey M Rutkowski
*Assistant Examiner* — Sudesh M Patidar
(74) *Attorney, Agent, or Firm* — Behmke Innovation Group LLC; Kenneth J. Heywood; Jonathon P. Western

(57) ABSTRACT

In one embodiment, a device receives data regarding a wireless client attempting to form an association with a particular wireless access point in a network. The device queries a blockchain ledger in a blockchain database for wireless roaming data regarding the wireless client. The device uses, when available from the blockchain ledger, the roaming data regarding the wireless client to complete the association between the wireless client and the particular wireless access point. The device updates the blockchain ledger with data regarding the association between the wireless client and the particular wireless access point.

18 Claims, 12 Drawing Sheets

(51) Int. Cl.
  H04L 9/06 (2006.01)
  G06F 16/951 (2019.01)
  *H04W 84/12* (2009.01)
  *H04W 88/02* (2009.01)
  *H04L 29/06* (2006.01)
  *H04W 12/04* (2021.01)
  *H04W 12/06* (2021.01)
  *H04W 12/08* (2021.01)
  *H04W 88/08* (2009.01)

(52) U.S. Cl.
  CPC ............ *H04W 84/12* (2013.01); *H04W 88/02* (2013.01); *H04W 88/08* (2013.01)

(56) References Cited

U.S. PATENT DOCUMENTS

| | | | | |
|---|---|---|---|---|
| 2006/0099929 A1* | 5/2006 | Frank | ................ | H04W 12/0401 455/411 |
| 2007/0060130 A1* | 3/2007 | Gogic | ................ | G01S 5/0252 455/440 |
| 2007/0288997 A1* | 12/2007 | Meier | ................ | H04W 12/0602 726/4 |
| 2011/0105155 A1* | 5/2011 | Bienas | ................ | H04W 68/02 455/458 |
| 2012/0134352 A1* | 5/2012 | Vu | ................ | H04W 12/06 370/347 |
| 2014/0094144 A1* | 4/2014 | Thorn | ................ | H04W 12/06 455/411 |
| 2016/0112942 A1* | 4/2016 | Chang | ................ | H04W 48/20 455/434 |
| 2016/0212695 A1* | 7/2016 | Lynch | ................ | H04W 48/08 |
| 2018/0254905 A1* | 9/2018 | Chun | ................ | H04W 4/70 |
| 2018/0287780 A1* | 10/2018 | Safford | ................ | G06F 21/51 |
| 2018/0309570 A1* | 10/2018 | Amini | ................ | H04L 1/18 |
| 2018/0359151 A1* | 12/2018 | Akhavain Mohammadi ................ H04W 12/0027 |
| 2019/0026450 A1* | 1/2019 | Egner | ................ | H04W 12/06 |

* cited by examiner

USING A BLOCKCHAIN FOR OPTIMIZED FAST-SECURE ROAMING ON WLANS

TECHNICAL FIELD

The present disclosure relates generally to computer networks, and, more particularly, to using a blockchain for optimized fast-secure roaming on wireless local area networks (WLANs).

BACKGROUND

In Wi-Fi environments, particularly those related to the Internet of Things (IoT), many networks include a variety of different types of devices. Typically, some of these devices may support 802.11 Fast-Secure Roaming (FSR) techniques for wireless local area networks (WLANs), such as sticky key caching (SKC), opportunistic key chaching (OKC), or 802.11r. Others, however, may only support Wi-Fi Protected Access 2 (WPA2) or even older protocols. In addition, some devices in the network may have constrained paths, some may have strong security requirements (e.g., access control lists, restricted roaming zones, etc.), etc. This heterogeneity across devices may impede efficient roaming in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
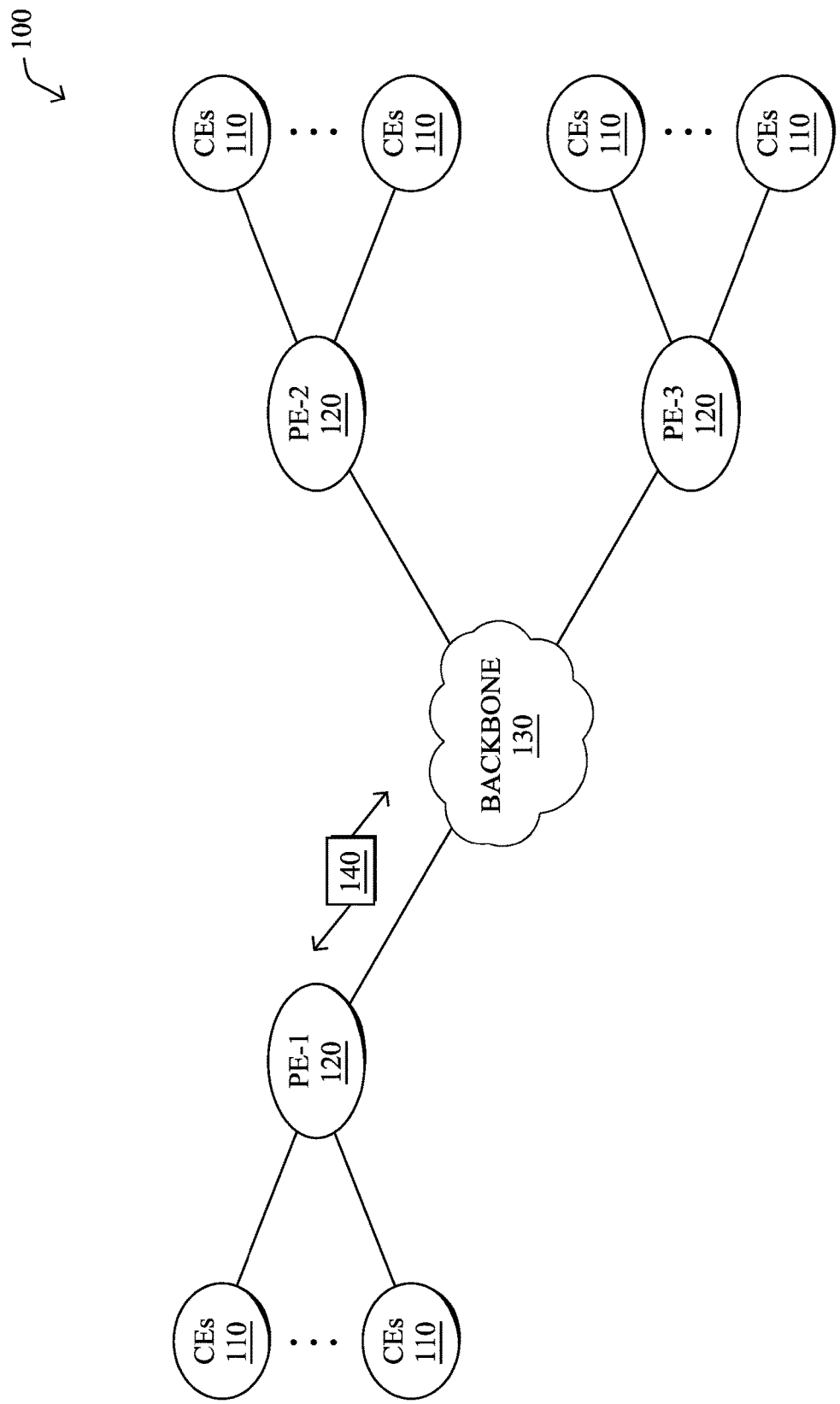
FIGS. 1A-1B illustrate an example communication network.

According to one or more embodiments of the disclosure, a device receives data regarding a wireless client attempting to form an association with a particular wireless access point in a network. The device queries a blockchain ledger in a blockchain database for wireless roaming data regarding the wireless client. The device uses, when available from the blockchain ledger, the roaming data regarding the wireless client to complete the association between the wireless client and the particular wireless access point. The device updates the blockchain ledger with data regarding the association between the wireless client and the particular wireless access point.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
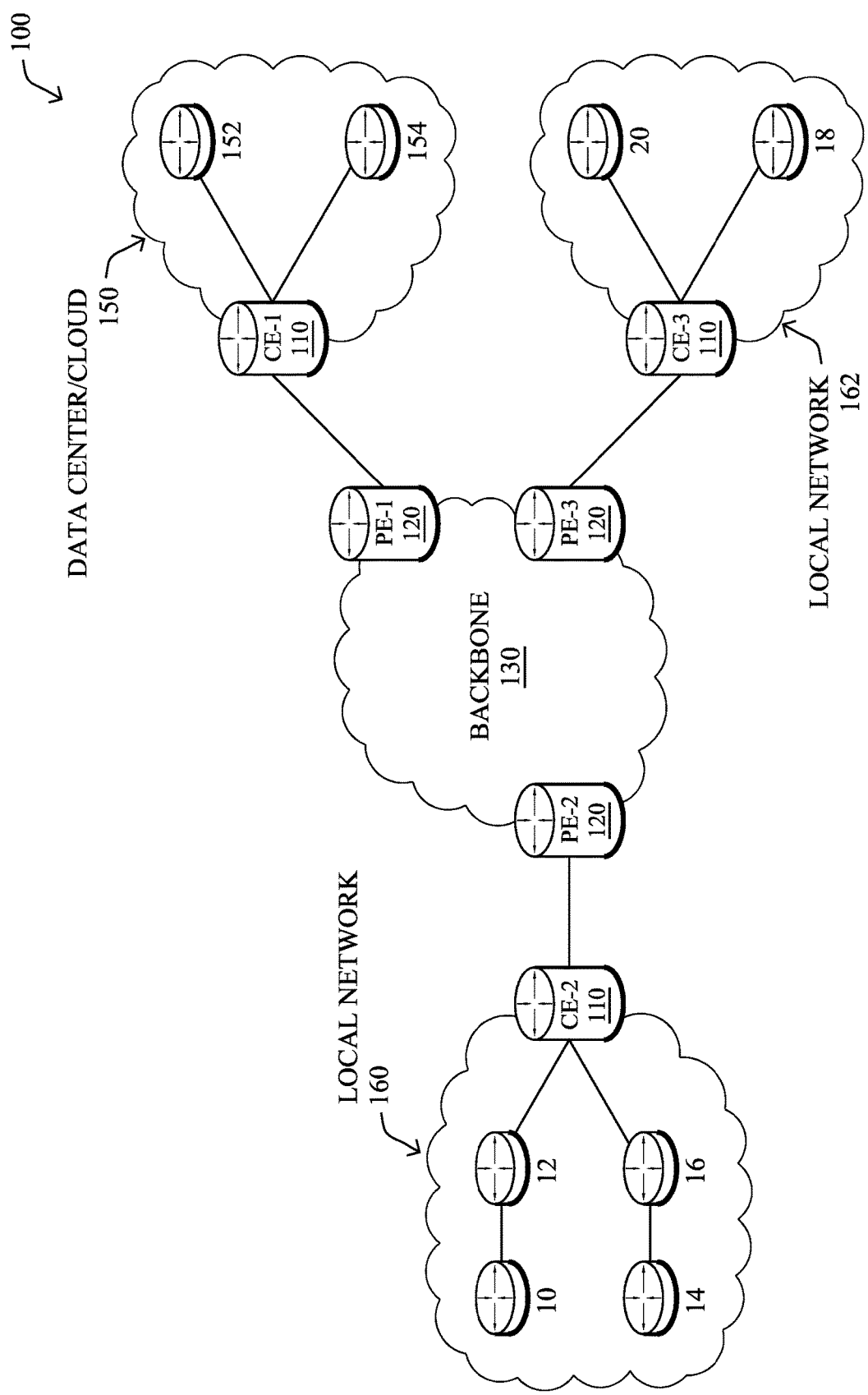

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
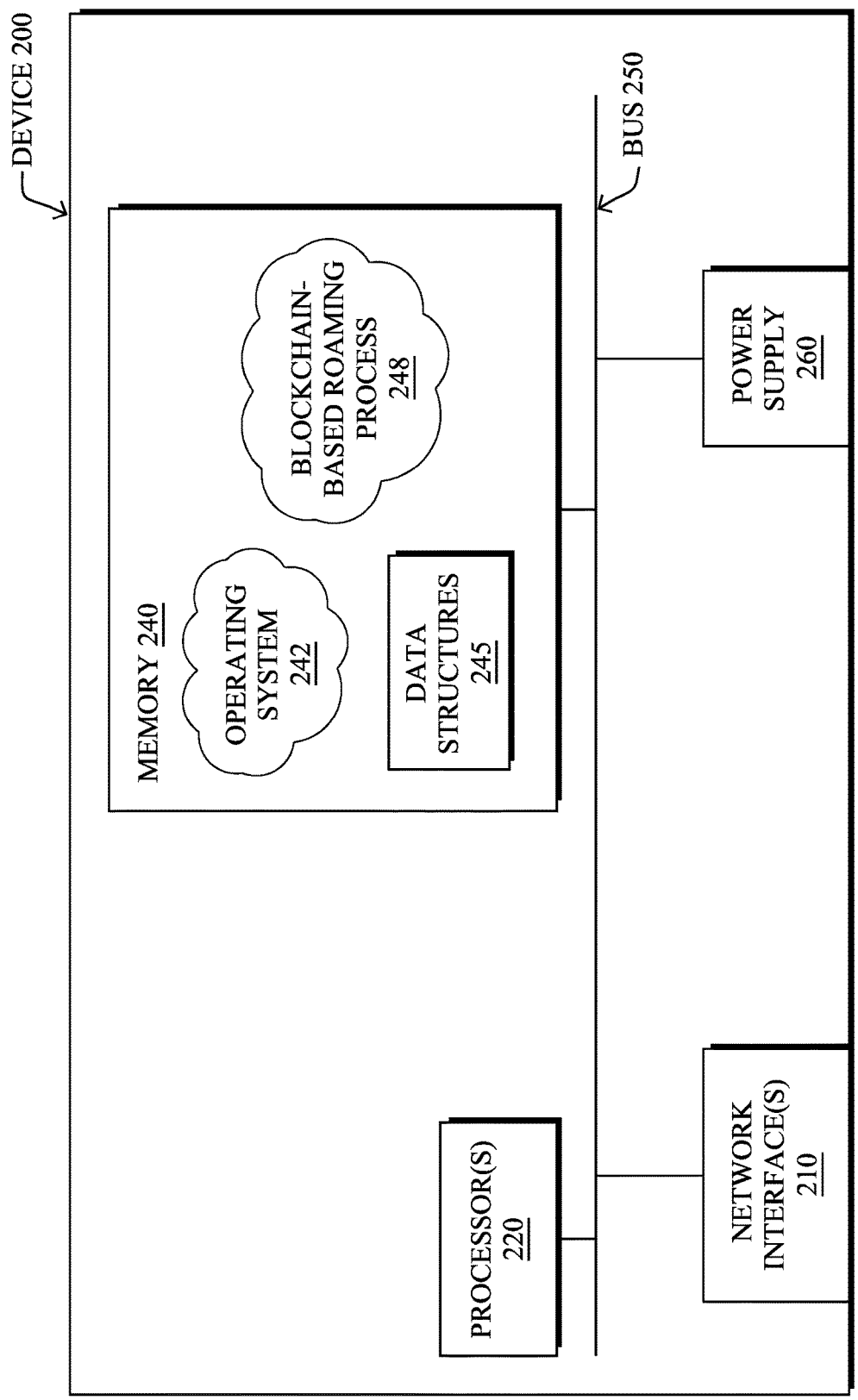
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a blockchain-based roaming process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, blockchain-based roaming process 248 may be configured to perform wireless roaming functions, such as authentication and authorization, using a distributed blockchain database that includes information regarding the roaming activities of wireless clients the network. Block chaining first emerged in the realm of cryptocurrencies and generally operates by ensuring a consensus among devices using a peer-to-peer, distributed database. Sometimes also referred to as alternative chaining outside the realm of cryptocurrencies, blockchaining provides that each peer device in the system maintain a copy of the entire list of changes in the system. For example, in the case of cryptocurrencies, the distributed database includes a listing of every transaction in which the cryptocurrency is exchanged.

A blockchain begins with the creation of a 'genesis' block. Each subsequent block then includes a hash of the previous block in the blockchain. This has two effects: 1.) modifying an existing block would also require regenerating each block after it, which is highly impractical from a computational standpoint and prevents malicious changes and 2.) the hashing mechanism provides an ordering to the blocks that traces all the way back to the genesis block, allowing devices to track changes in the system. The actual data content of the blocks can also vary. For example, while blocks in a cryptocurrency typically include a listing of currency exchanges/transactions (e.g., Alice transfers $5 to Bob), the data in the blocks is not limited as such and can include any information.

In some cases, blocks in a blockchain can also make use of a digital signature mechanism to validate the contents of a block. For example, in the case of cryptocurrencies, a transaction that transfers funds between entities can also include a digital signature and a corresponding public key that can be used to ensure that entity performing the transfer actually has ownership of the funds (e.g., by referencing prior transactions associated with the signer that show the signer as having sufficient funds). In many cases, the signature mechanism uses elliptic curve digital signature algorithm (ECDSA)-based signatures. However, other signature techniques can be used in other implementations.

As noted above, the heterogeneity of devices in many wireless networks presents several challenges for efficient wireless roaming. In particular, the varying capabilities and requirements of the different devices may lead to the following:

1.) Almost every known form of fast-secure roaming is dependent on the capabilities of the individual clients. For example, support for 802.11r, which is critical for fast roaming, is chipset and OS-dependent. Thus, if 802.11r is enabled in the network, other devices that do not support this standard would not be able to use this functionality. Similarly, other chipsets may implement other mechanisms to enable fast roaming, such as Cisco Compatible Extensions (CCX) for smart objects, sticky key caching (SKC), and opportunistic key chaching (OKC).

2.) Some of these features are not compatible with one another, and they cannot all be enabled on the WLAN at the same time. As a result, only limited support is offered for some mechanism in any network, usually covering the most vulnerable clients, or the clients for which fast roaming is most critical to the business, thereby forcing other clients into a full re-authentication cycle.

3.) In multi-tenant environments, multiple wireless systems (WLCs) may be in control of different organizations, with no clear trust between them. Distributing keying material, for a device authenticated on one organization system, to other organizations systems, is also not supported in most environemnts.

Using a Blockchain for Optimized Fast-Secure Roaming on WLANs

The techniques herein introduce a fast secure roaming (FSR) mechanism for wireless networks that leverages blockchain technology, not only as an alternative to standard FSR, but to provide an additional layer of redundancy to existing FSR mechanisms. The blockchain-based mechanism increases the security of the WLAN and predictability of the traffic. In some aspects, a blockchain ledger can be used to convey keying material between separately administered devices and/or organizations that do not trust one another or belong to the same mobility domain. In further aspects, the techniques herein allow for better detection of media access control (MAC) address spoofing and fake MAC attacks.

Specifically, according to one or more embodiments of the disclosure as described in detail below, a device receives data regarding a wireless client attempting to form an association with a particular wireless access point in a network. The device queries a blockchain ledger in a blockchain database for wireless roaming data regarding the wireless client. The device uses, when available from the blockchain ledger, the roaming data regarding the wireless client to complete the association between the wireless client and the particular wireless access point. The device updates the blockchain ledger with data regarding the association between the wireless client and the particular wireless access point.

Illustratively, the techniques described herein may be performed by hardware, software, and/or firmware, such as in accordance with the blockchain-based roaming process 248, which may include computer executable instructions executed by the processor 220 (or independent processor of interfaces 210) to perform functions relating to the techniques described herein.

Operationally, the techniques herein use blockchain technology to create a blockchain database of client roam activity in a ledger, which can operate on its own or in parallel with other existing (fast or not) roaming mechanisms. In simple terms, an initial testing/provisioning phase associates any new client type to a WLAN. Vendor documentation, prior knowledge of the client, discovery of the client capabilities during the association phase, or an online shared database can be used to determine the client fast roaming mechanism support (e.g., 802.11r, SKC, OKC, CCKM, etc.), along with the encryption support (e.g., AES, TKIP, etc.). Additional parameters relevant to roaming can also be determined, such as support for 802.11k, 802.11v, 802.1x or PSK, etc. In addition, other parameters that are not directly related to roaming can also be associated with each individual client or client type (e.g., allowed roaming path, ACLs, expected traffic flow, etc.). In various embodiments, the resulting client profile type is then written to a blockchain ledger in the database, which can be stored on one or more wireless LAN controllers (WLCs) and/or by external service reachable by the WLCs. The resulting entry can be device-specific, or generalized to all devices of the same type (e.g., same OUI, etc.).

Figure 3A:
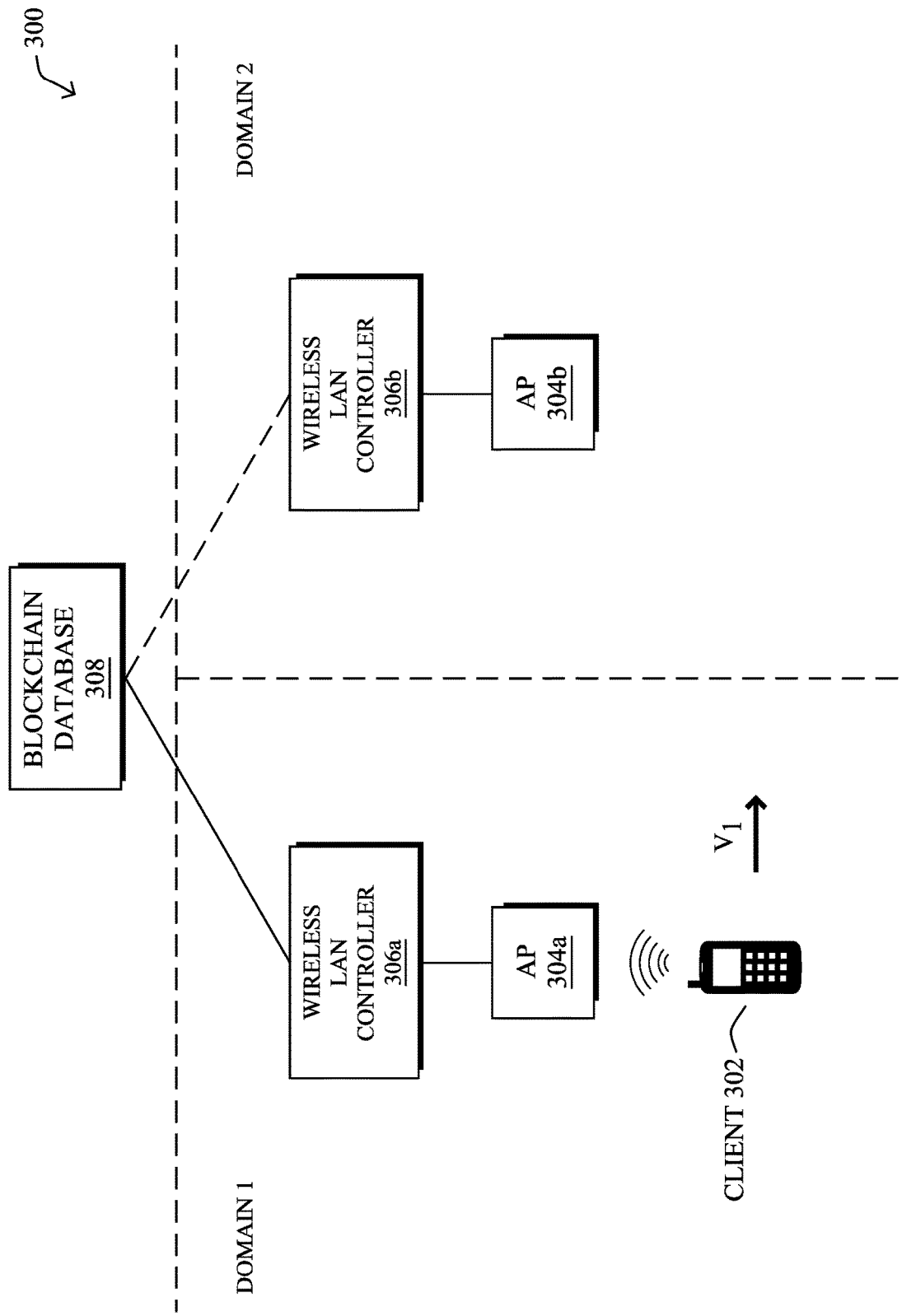
FIGS. 3A-3B illustrate an example of a client roaming between wireless domains.
Figure 3B:
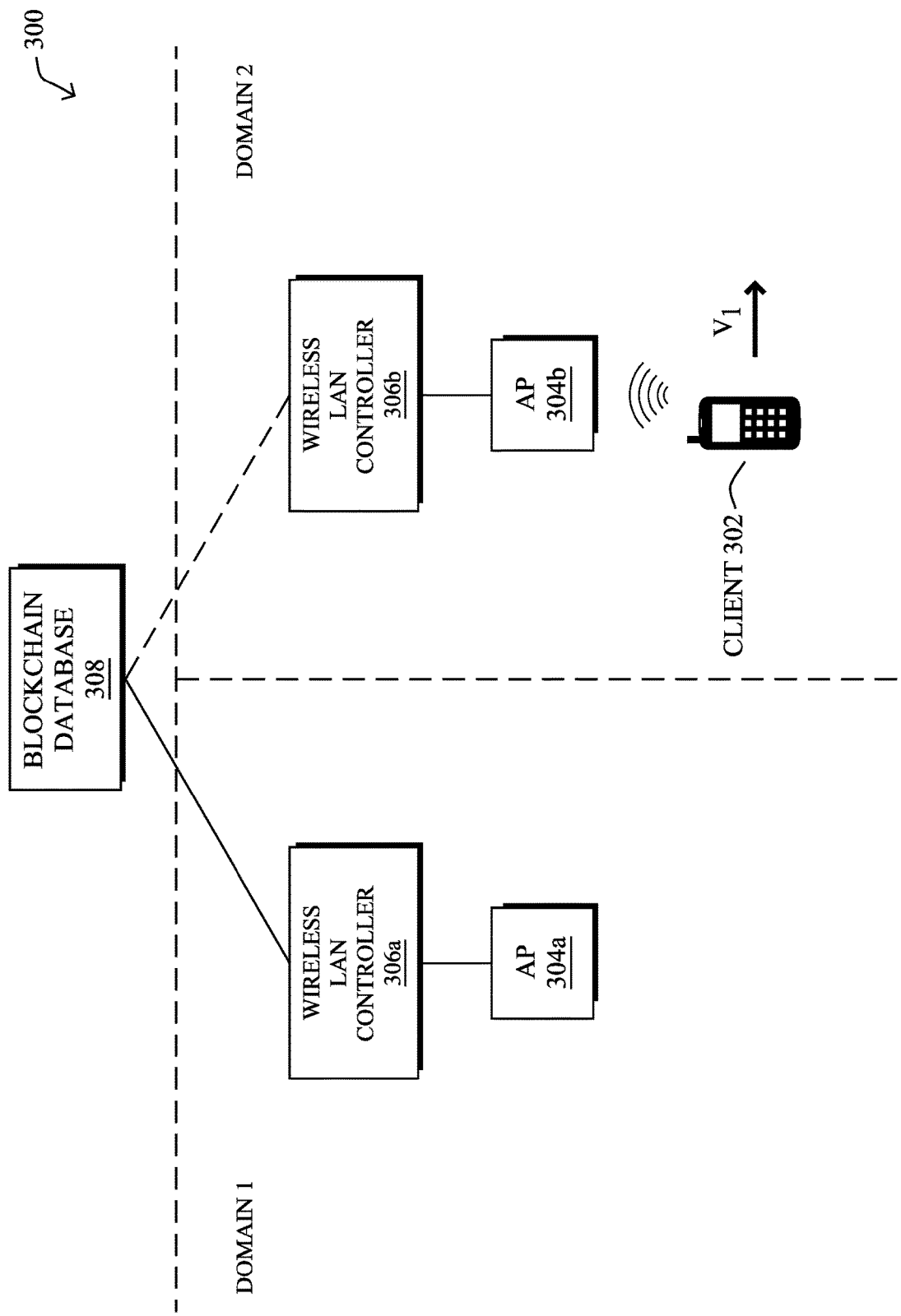

By way of example of the techniques herein, FIGS. 3A-3B illustrate an example 300 of a client 302 roaming between wireless domains, according to various embodiments. Notably, as shown, assume that a first domain includes a first wireless access point (AP) 304a that is controlled by a WLC 306a and that a second domain includes a second AP 304b that is controlled by a WLC 306b. In various cases, the two domains may even be operated by different organizations or entities that separately administer their respective domains. For example, the first domain may be a first retailer located in a mall, while the second domain may be another retailer located in the same mall. In such a case, both retailers may maintain and administer their respective networking equipment. Using the techniques herein, even in such cases, client 302 may be still be able to fast roam between APs 304a-304b.

Consider the case in which client 302 is currently associated with (e.g., attached to) AP 304a, but is traveling at a velocity $V_1$ away from AP 304a and towards AP 304b. In such a case, WLC 304a or, alternatively, AP 304a, may write roaming data regarding client 302 to a ledger in blockchain database 308. For example, this roaming data may identify client 302 (e.g., its MAC address, etc.), keying information used to form an association with an AP, and/or other information that may be used during the roaming process.

In FIG. 3B, when client 302 decides to initiate roaming to AP 304b, WLC 306b (or AP 304b) may perform two operations, which may be done in parallel:
1.) Execute selected roaming validation to move client 302 to a Run state. This process may be driven by the configuration of the service set identifier (SSID) used by AP 304b.
2.) In parallel, a query may be performed on blockchain database 308 for the Client-AP roaming history of client 302 in a ledger and potentially within a predefined interval. This process is purely ledger driven based on previous successful authentication history.

Whichever process returns the fastest green signal is then used to move client 302 into a RUN state. For example, when client 302 moves from one initial WLC 306 to another WLC 306 within the same local domain or network, standard fast roaming techniques may be faster. However, when client 302 roams back to its initial WLC 306 (e.g., a Kavi robot following the same paths), using the ledger history in blockchain database 308 may be faster than using standard fast roaming approaches. Of course, existing fast roaming can also be used in case blockchain database 308 experiences any transactional delays, as well.

Figure 4:
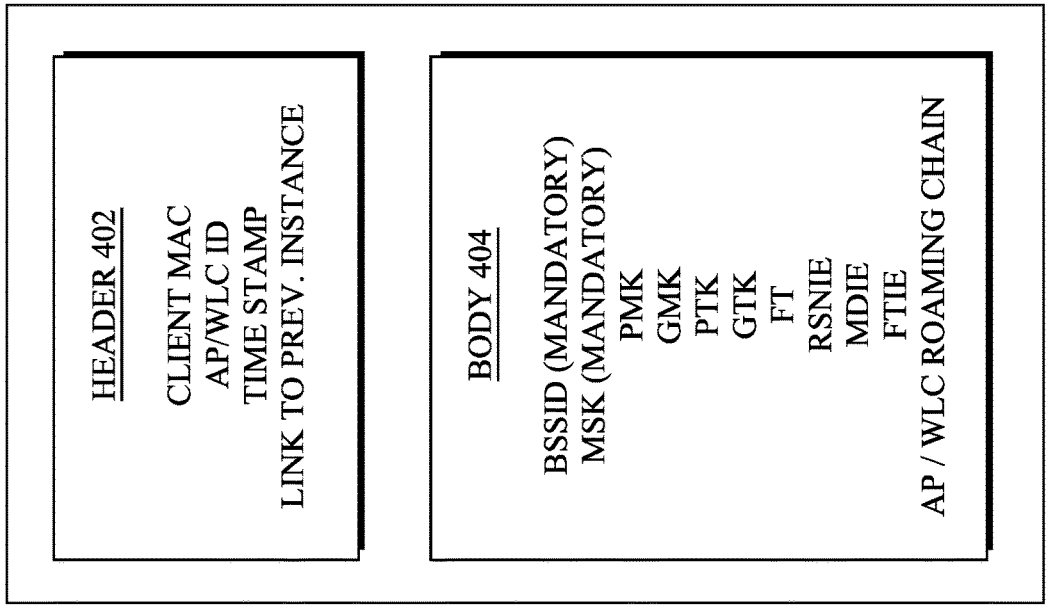
FIG. 4 illustrates an example blockchain block.

FIG. 4 illustrates an example blockchain block 400 in accordance with the techniques herein, in various embodiments Like conventional blocks in a blockchain architecture, wireless block 400 may have two fields: a header 402 and a body 404. In various embodiments, header 402 may store any or all of the following information:
Client MAC or other identifier—this identifier uniquely identifies the wireless client.
AP and/or WLC identifier—this identifier uniquely identifies the AP and/or WLC to which the client is attached.
Timestamp information—this timestamp may indicate, for example, when the client formed an association with the AP/WLC.
Link to Previous Instance—if applicable, this may link block 400 to its parent block within the ledger (e.g., using a hashing mechanism).

In general, body 404 of block 400 may include the fast secure roaming parameters that can be used to perform roaming in the network. Example data that can be stored in body 404 may include, but is not limited to, any or all of the following:
Basic service set identifier (BSSID)—this may be mandatory, in some embodiments, and may indicate the SSID assigned to a particular MAC of the AP indicated in header 402.
Master session key (MSK)—this may also be mandatory, in some embodiments, and may indicate the MSK used to form the association between the client and the AP.
Pairwise master key (PMK)
Group master key (GMK)
Pairwise transient key (PTK)
Group temporal key (GTK)
Fast transition (FT) data
Robust Security Network Information Exchange (RSNIE) data
Mobility domain information element (MDIE) data
Fast base substation system transitional information element (FTIE) data
AP/WLC roaming chain data As would be appreciated, the structure of block 400 is just one potential embodiment of the information elements inside the header and body of the block. This could also be much broader and include more information elements accommodating other FSR techniques, and also additional parameters such as which access control list (ACL) to apply, quality of service (QoS) level to apply, etc.

In most implementations, a WLC and its mobility peers may be the only devices that are required to create/maintain/update the wireless roaming blockchain ledger. However, in further embodiments, the ledger can also be stored by an entity or service external to the WLC and, during roaming, may be accessed by the WLC.

Figure 5A:
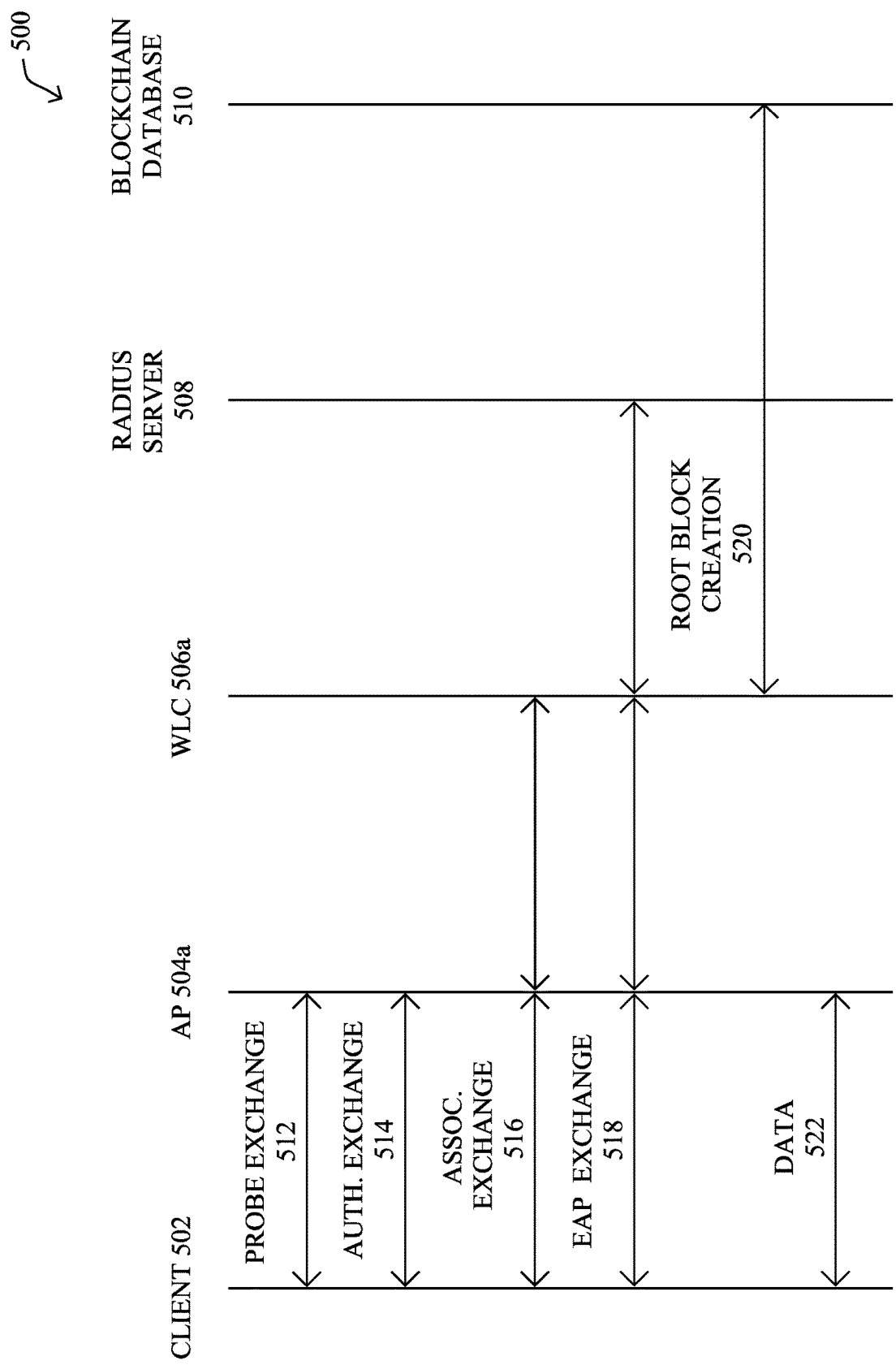
FIGS. 5A-5B illustrate examples of using a blockchain ledger for wireless roaming.
Figure 5B:
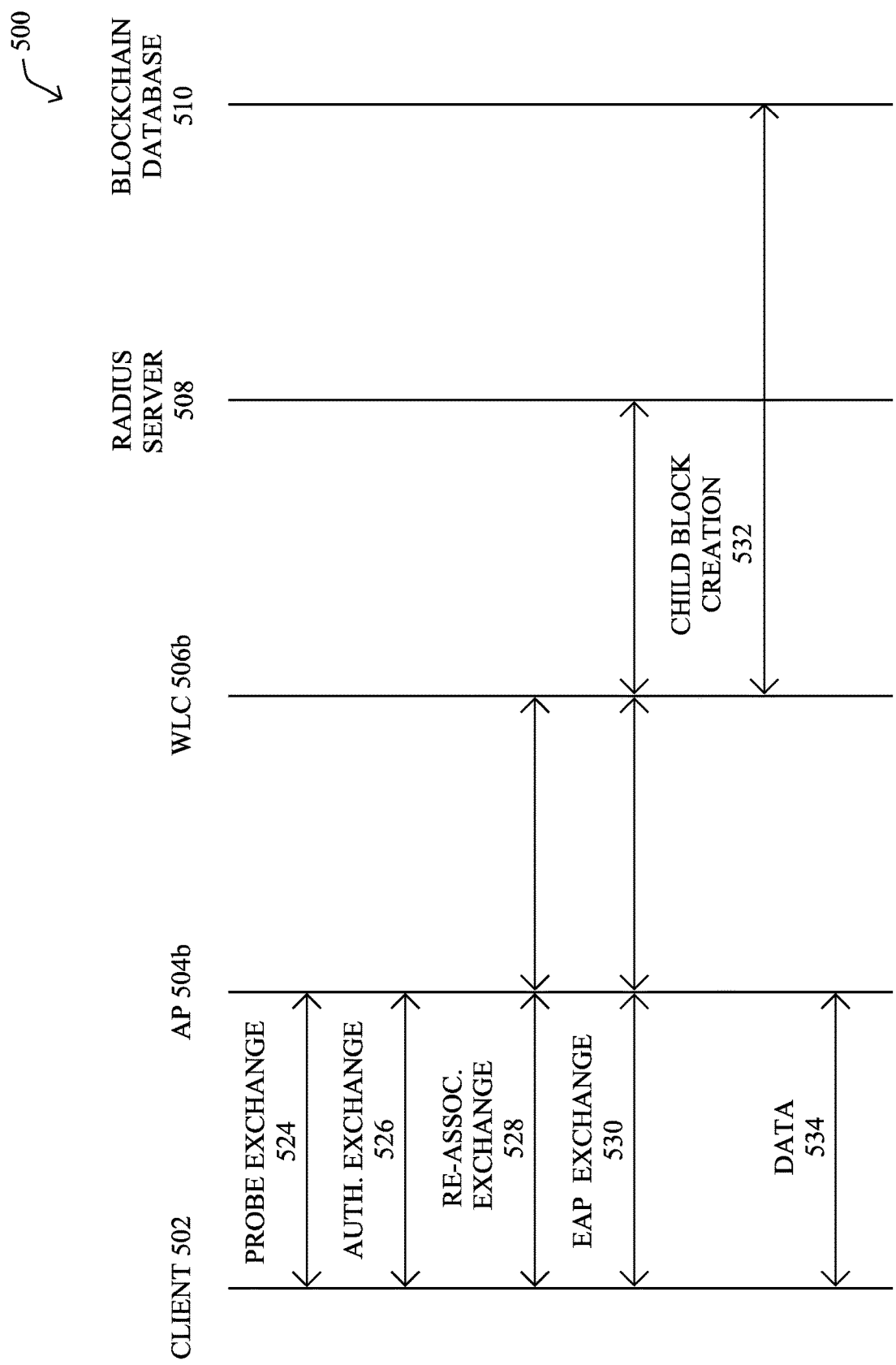

FIGS. 5A-5B illustrate examples of using a blockchain ledger for wireless roaming, according to various embodiments. To better illustrate how blockchain-based roaming may be performed, FIG. 5A illustrates the process for initial client association and root block creation. During this process, a new association between a client and AP triggers the creation of a new block structure in the blockchain database, which may be in accordance with the block structure described with respect to block 400 in FIG. 4. This will be the first of the "chain" of blocks that will be created with client roams.

As shown in flow diagram 500 of FIG. 5A, there may be several actors involved in the formation of an association between a wireless client 502 and a particular AP, AP 504a. Notably, AP 504a may be supervised by WLC 506a and may be in communication with an Authentication, Authorization, and Accounting (AAA) server, such as Remote Authentication Dial-In User Service (RADIUS) server 508 shown. In addition, WLC 506a may be in communication with a blockchain database 510 that may be distributed among WLCs, stored in a central or cloud-based location, or the like. Knowledge of the various device capabilities may be shared, in various embodiments, using blockchain database 510 across the WLCs and/or RADIUS server 508, as detailed below.

To begin the process, client 502 may initiate a probe exchange 512 with AP 504a in which client 502 sends a probe request to AP 504a and AP 504a returns a probe response. Such information during the probe exchange 512 can be used, for example, to profile client 502, to recognize the capabilities of the client, for use when creating the initial blockchain ledger for client 502. This recognition can also take place during the association phase, or at any other time, prior to client 502 roaming to another AP.

In turn, an authentication exchange 514 may ensue in which client 502 shares authentication information with AP 504a, such as identification information for client 502, etc. After authenticating client 502, an association exchange 516 may ensue between AP 504a and client 502, and this association may be overseen by WLC 506a.

As would be appreciated, subsequent to the authentication and association exchanges 514-516, AP 504a may initiate an Extensible Authentication Protocol (EAP) exchange 518, to leverage the AAA services of RADIUS server 510. During exchange 518, keying information may be generated and shared with client 502. For example, RADIUS server 510 may send a PMK to AP 504a that can be independently derived by client 502. This PMK can then be used to derive another set of keys, PTKs, which are used to secure traffic over an encrypted link between client 502 and AP 504a. The PTKs are derived and installed via a four-way handshake using EAP key frames. In turn, data traffic 522 may be exchanged between client 502 and AP 504a.

According to various embodiments, WLC 506a may query blockchain database 510 for ledgers regarding client 502 (e.g., using the specified MAC address of client 502). If no such ledger exists, or is active/valid, WLC 506a may create a root block via exchange 520 within blockchain database 510 that includes any or all of the information about the association between client 502 and AP 504a, as detailed above with respect to FIG. 4. For example, such a root block may identify client 502, the time at which it associated with AP 504a, the identity of AP 504a, keying information such as the MSK or PMK used, or the like. This information from the root block creation, as well as all subsequent block updates, may be shared across all mobility peers of WLC 506a, making both inter-controller as well as intra-controller client roaming possible.

As would be appreciated, the use of blockchain database 510 provides several improvements over that of existing MAC address distribution approaches. Notably, in current networks, client information distribution heavily depends on the roaming mechanism in place in the network. For example, 802.11r distributes MSK, ROKH-ID and R1KH-ID information over all controllers in a mobility group, which multiplies the entries and limits the amount of supported clients in a given network. Other FSR methods rely on the new controller querying all the other WLCs for the client MAC, to limit the amount of space used by each client entry. In contrast, in the techniques introduced herein, the header of the block may be distributed across the WLCs. As the header of the block is comparatively small in size, its memory consumption is reduced, allowing each WLC to support a very large number of MAC addresses at a single time. At the same time, each WLC has information about the client device, current AP, and WLC, for each association.

As shown in FIG. 5B, now assume that client 502 roams to another AP, AP 504b. For purposes of illustration, assume that AP 504b is supervised by a different WLC than that of AP 504a, WLC 506b. However, it may also be the case that APs 504a-504b are supervised by the same WLC, in further cases. By distributing the header of the root block created in FIG. 5A, WLC 506b already has MAC address and other information regarding client 502 and, therefore, knows to query WLC 506a for FSR method data and credentials for client 502. Transmission of these elements may happen at probe request time, such as during probe exchange 524. Exchanges 526, 528, and 530 may then ensue, as normal.

Irrespective of the FSR technique used to form the association between client 502 and AP 504b, WLC 506b may create a new child block for client 502 in blockchain database 510 via exchange 532 that includes the mandatory and optional fields of roaming parameters regarding the roaming of client 502 to AP 504b. This forms the first blockchain for client 502 and may serve as a ledger for future roams involving client 502.

Figure 6A:
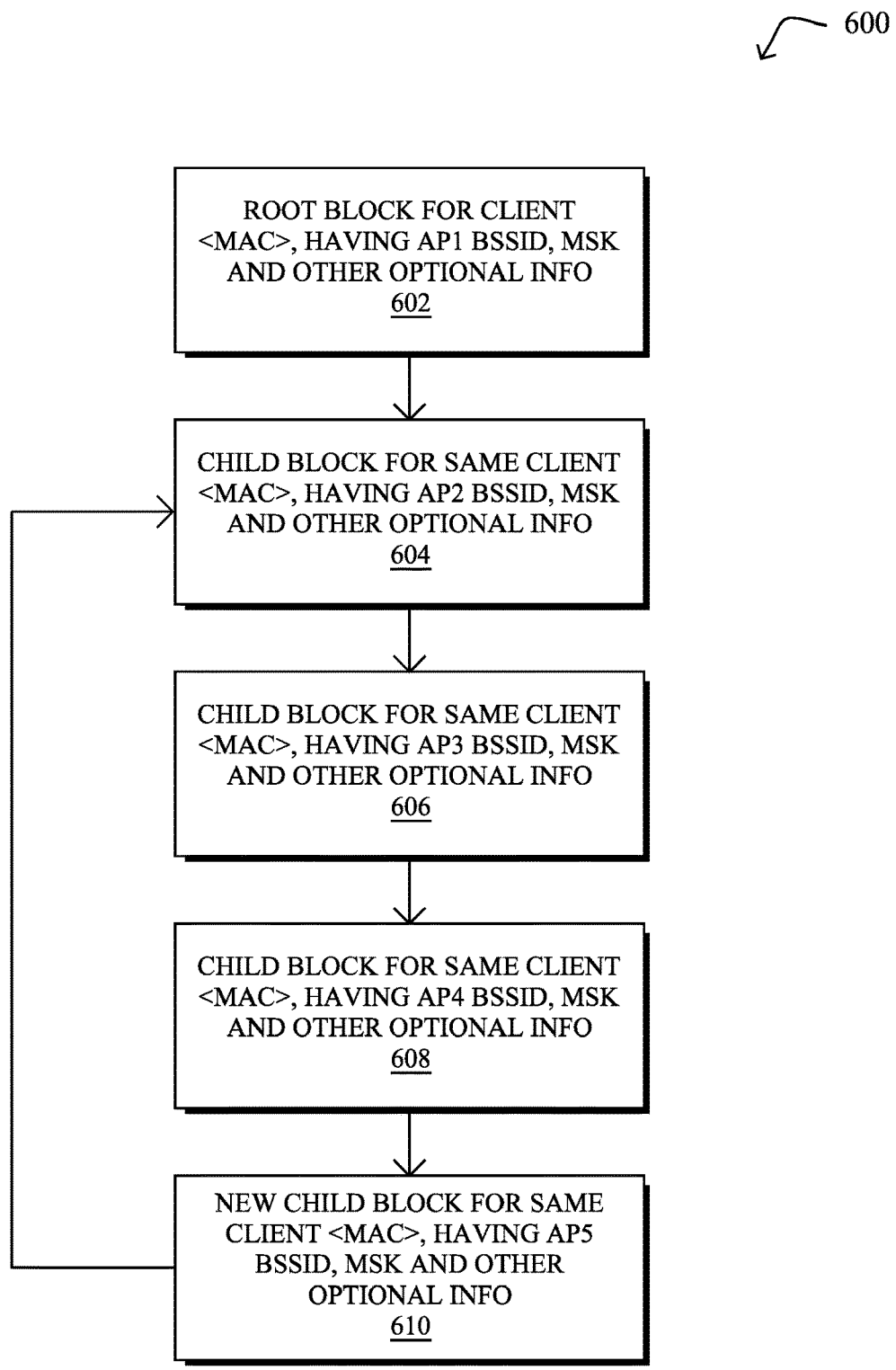
FIGS. 6A-6B illustrate examples of a blockchain ledger as a wireless client device roams.
Figure 6B:
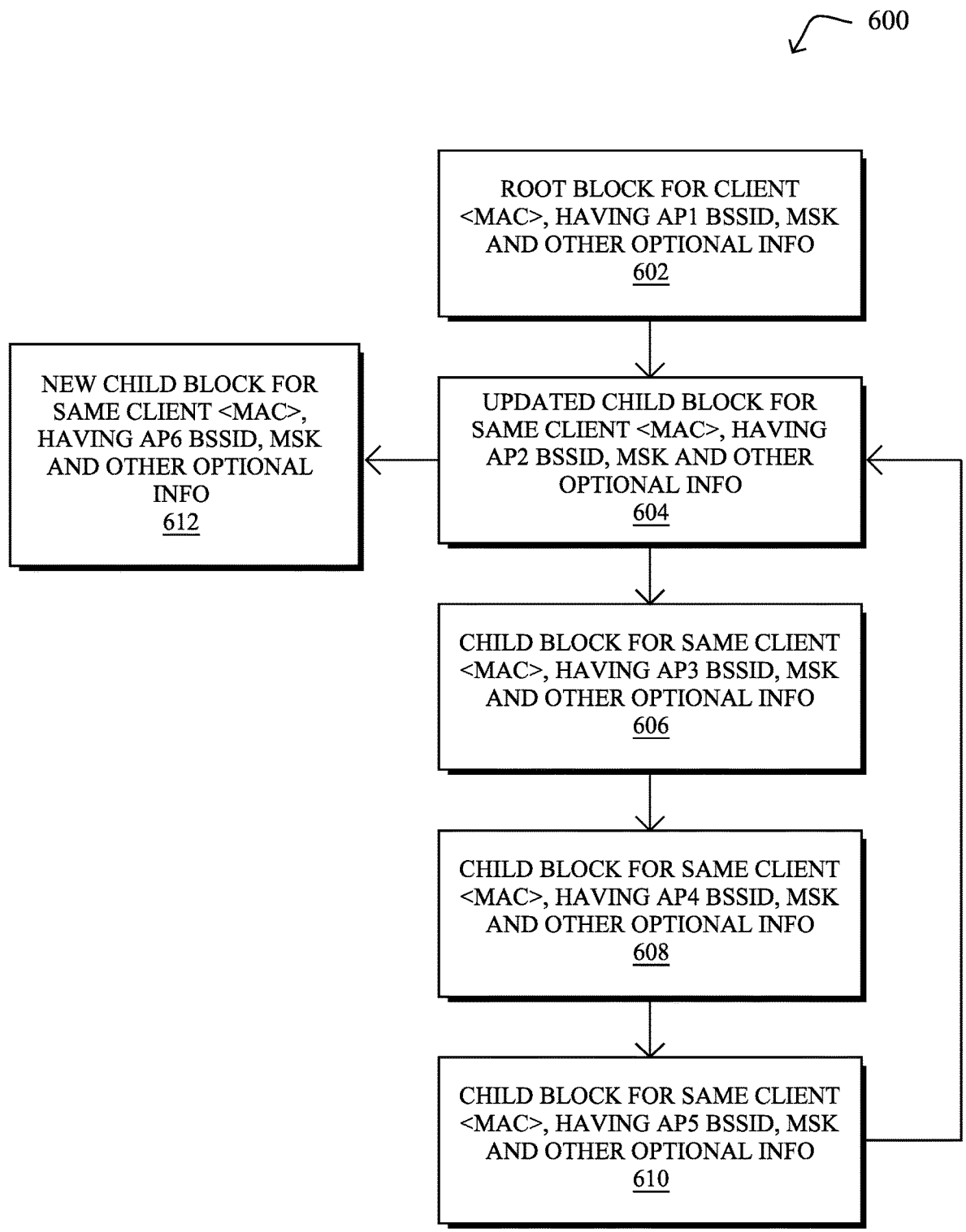

FIGS. 6A-6B illustrate examples of a blockchain ledger 600 as a wireless client device roams, according to various embodiments. Continuing the example of FIGS. 5A-5B, ledger 600 may include the root block 602 formed for client 502 in FIG. 5A. Such a block may indicate, e.g., the MAC of client 502, the BSSID of AP 504a to which client 502 was associated, MSK data, and/or other optional information regarding this association. On roaming to the second AP, AP 504b, in FIG. 5B, a child block 604 may be added to ledger 600 that includes the relevant roaming information. Subsequent children blocks 606-610 may be added to ledger 600 in a similar manner, such as when client 502 roams to a third, fourth, and then fifth AP. Irrespective of the FSR technique used, a new block with optional and mandatory fields of roaming parameters is created each time in ledger 600, thereby forming a ledger for the specific associations of client 502.

As shown in FIG. 6B, assume that after associating with the fifth AP indicated in block 610, client 502 roams back to an AP whose FSR information is already populated in ledger 600. Notably, as shown, client 502 may roam back to AP 504*b* whose FSR information was previously populated in block 604 of ledger 600. In such a case, as soon as the 802.11 auth. frame is received from client 502, the corresponding WLC (e.g., WLC 506*b*) may perform a query to ledger 600 to match the MAC of client 502 and BSSID of AP 504*b* to block 604. In turn, the WLC may forward the FSR information in block 604 on to AP 504*b*. On receiving the re-association request from client 502, AP 504*b* is now ready to send a re-association response using the FSR information obtained from the blockchain ledger 600. In such a case, block 604 may also be updated with the relevant information regarding this re-association, as well.

Note that in some embodiments, the blockchain-based FSR mechanism can run in parallel with an existing/traditional FSR mechanism. Thus, whichever FSR mechanism returns a faster re-association response with the necessary FSR information elements may override the other, thereby reducing the roaming time and providing true redundancy to the client FSR.

For further purposes of illustration, after client 502 uses ledger 600 to perform a successful roam back to AP 504*b*, assume that client 502 now roams to a sixth AP. In such a case, a new child block 612 may be created from block 604 to capture the information regarding this association.

In various embodiments, a timer mechanism may be employed to time out the blockchain ledger for a client. For example every time the blockchain gets updated with new block, the blockchain timer may be reset with the WLC Session or Idle timer, whichever is lower. If there is no new roaming event, the blockchain timer validates whether the client is still active and, if not, remove the corresponding information from the local database of the WLC. If client has been removed from the WLC database, then the blockchain ledger reference for the client may also be removed and a new blockchain created when the client again associated with an AP. Conversely, if the client is still active and passing traffic with an AP, the blockchain timer may again be updated to the WLC Session or Idle timer, whichever is the least, to continue maintaining the blockchain ledger.

Figure 7:
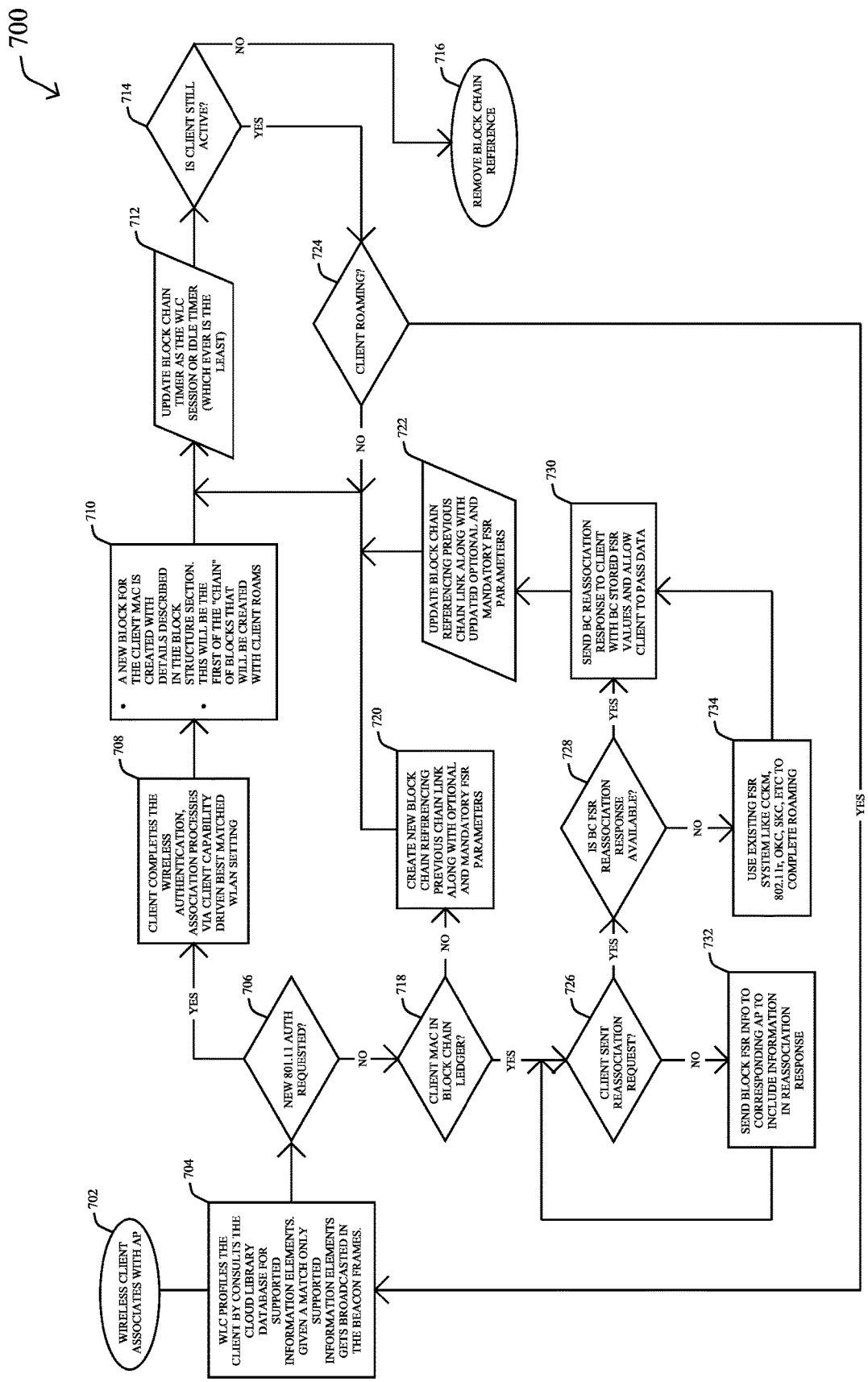
FIG. 7 illustrates a flow diagram of using a blockchain for optimized fast roaming on a wireless local area network (WLAN)

FIG. 7 illustrates a flow diagram 700 of using a blockchain for optimized fast roaming on a WLAN. As shown, the client may initiate an associate with an AP using the normal association mechanism of the network (step 702). In turn, the WLC or other device may profile the client by consulting a cloud library database for supported information elements and include the supported elements in beacon frames broadcast back to the client (step 704). A decision may then be made as to whether the request from the client is a new 802.11 authentication request (step 706). If so, the client may complete the authentication and association, in accordance with its own capabilities (step 708). Using the techniques herein, a new root block for the MAC of the client may then be created in the blockchain database (step 710). If a blockchain timer mechanism is also used, the timer may be updated with the WLC Session or Idle timer, whichever is the least amount of time (step 712). This timer can then be used to determine whether the client is still active (step 714) and, if not, the blockchain reference to the client may be removed (step 716).

In the case in which the client request is not a new request, a decision may be made as to whether the MAC of the client is already in a blockchain ledger (step 718). If not, a new block may be added to the blockchain referencing the previous chain link along with the FSR parameters (step 720). If the MAC is already in the ledger, another decision may be made as to whether the request from the client is a re-association request (step 726). If not, the FSR information from the block may be sent to the AP for inclusion in the re-association response (step 732). However, if the client request is a re-association request, a further decision may be made as to whether the blockchain already has a re-association response available (step 728) and, if so, the re-association response may be sent back to the AP (step 730) and update the blockchain to reference the previous chain link along with mandatory and optional FSR parameters (step 722). However, if no re-association response is available from the blockchain, or if one cannot be retrieved in sufficient time, an existing FSR mechanism may instead be used (step 734).

Once the client is associated with an AP, this process may be repeated iteratively by repeatedly checking whether the client is still active (as in step 714) and, if so, checking whether the client is roaming (step 724). If the client is not currently roaming, the blockchain timer may be updated again (step 712). However, if the client is roaming, new profiling of the client may be performed (step 704) and the procedure above may repeat itself any number of times.

As would be appreciated, existing WLC roaming techniques, including FSR techniques (e.g., 802.11r, CCKM, SKC/OKC), are static. Notably, SKC cannot be statically enabled on the same WLAN as OKC, and smart objects that support one method typically do not support the other. As a result, only the "worst common denominator" is typically configured on the WLAN in terms of roaming mechanisms.

By contrast, the blockchain-based mechanism introduced herein is dynamic, client-based, and includes the concept of race condition to provide the fastest possible key derivation and roaming speed. Each client can receive the best roaming mechanism for that target client, by pre-provisioning the client ledger entry to neighboring access points. The ledger being smaller than the regular client entry, the AP can also store client-specific roaming schemes, and apply these schemes to its response to known roaming client probes. At the same time, using the ledger in a race condition with the standard roaming mechanisms increases roaming speed. When the client roams back to a WLC to which it was connected before (during the same session), the ledger is likely to provide a faster roaming result than standard inter-WLC exchanges.

Also, the ledger provides a way to distribute client keying material between WLCs that do not belong to the same mobility domain, and belong to organizations that cannot trust each other. Additionally, the ledger can store the history of the client roam. This possibility is not present with current roaming techniques (AP or WLC-based). This is particularly of interest in the IoT. Notably, in scenarios whereby IoT devices cannot always use a strong authentication mechanism, storing roaming history offers an additional level of security, by rendering client impersonation more difficult. A MAC address is either new to the network, or already present in the ledger. An attacker cannot spoof a smart object MAC address when the smart object is already active on a given AP. This impersonation would immediately be spotted by the MAC address being associated to two APs. Without a ledger and the client header distributed among all WLCs, such impersonation is not detected.

In addition, in multi-tenant scenarios where analytics on client count is critical (and of high value), client roaming (and dwell) history can allow to immediately detect analytics attacks (e.g. competitor generating a large number of fake client MACs in targeted areas of a store). The roaming history can also be configurable. For example, in scenarios of limited or constrained paths (e.g. robots in a warehouse traveling always the same path), the roaming path can be added as parameter to the ledger (static configuration or path learned from a calibration phase). The target client MAC is therefore only allowed to roam between identified and listed APs (possibility with a constrained sequence). This addition reinforces the security of the IoT operation as impersonation of the smart object MAC address is more difficult, and deviation from planned route can be flagged immediately.

Lastly, the ledger can store additional, non-roaming related parameters, such as ACLs or expected traffic patterns, in further embodiments. This information can be used to pass efficiently those parameters as the client roams. These parameters can also increase the security of operations, by identifying any MAC address that would deviate from the expected traffic pattern (e.g., spoofing). Additionally, QoS parameters can dynamically be pushed as the client roams. When the smart object is constrained to a roaming path, those QoS parameters can be pushed in anticipation and dynamically as the client roams (to the next AP, or the next switch on the path), thus rendering the network flow volumes and types more deterministic, and allowing for better planning of network resources.

Figure 8:
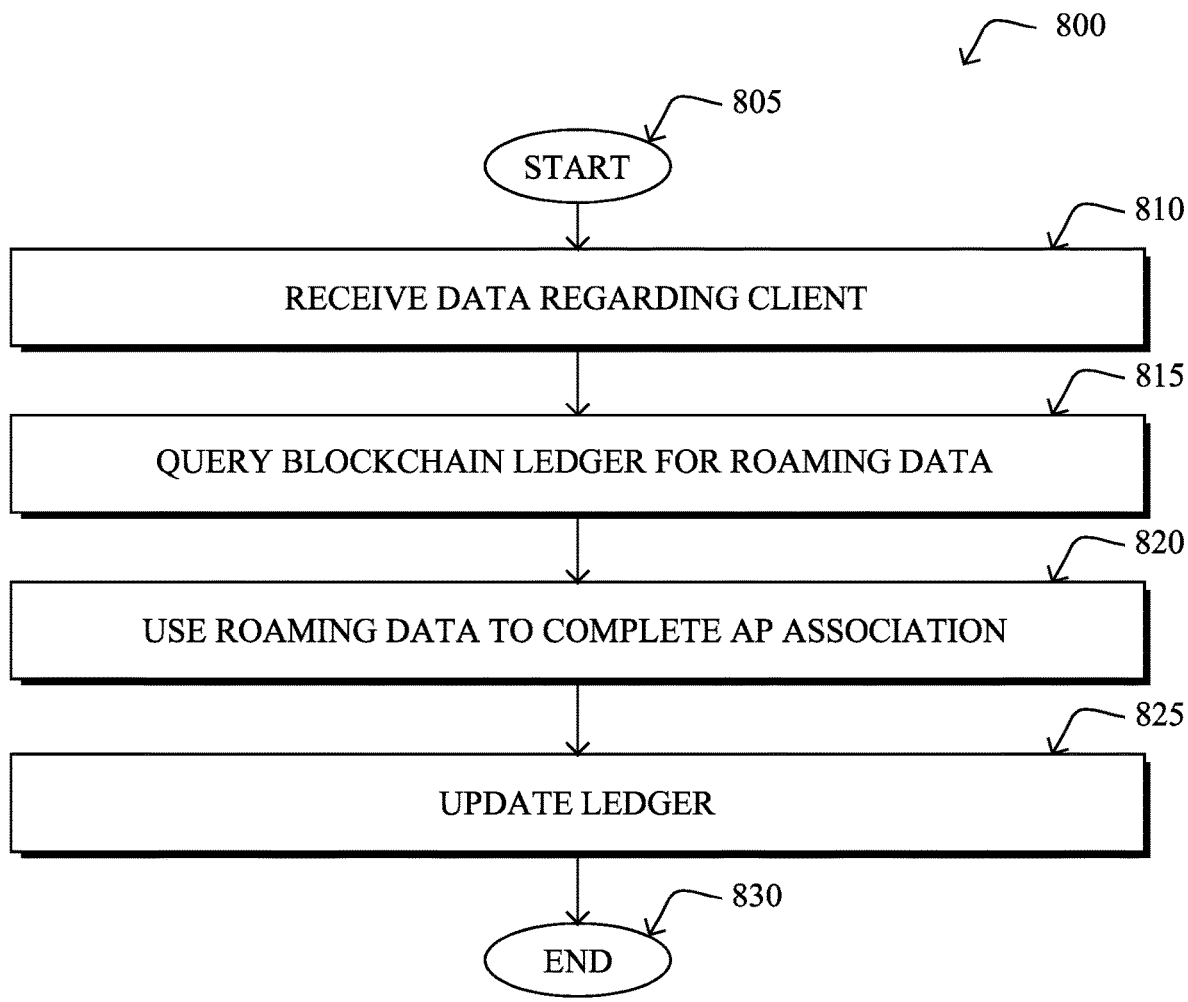
FIG. 8 illustrates an example simplified procedure for using a blockchain for wireless roaming.

FIG. 8 illustrates an example simplified procedure for using a blockchain for wireless roaming in a network, in accordance with one or more embodiments described herein. For example, a non-generic, specifically configured device (e.g., device 200), such as a WLC, may perform procedure 800 by executing stored instructions (e.g., process 248). The procedure 800 may start at step 805, and continues to step 810, where, as described in greater detail above, the device may receive data regarding a wireless client attempting to form an association with a particular wireless access point in a network. In some embodiments, this data may include an indication of the client, such as its MAC address, the identity of the AP to which the client is attempting to associate, timestamp information, capability information for the client (e.g., which FSR mechanisms are supported, etc.), or the like.

At step 815, as detailed above, the device may query a blockchain ledger in a blockchain database for wireless roaming data regarding the wireless client. For example, the device may perform a header lookup of the MAC address or other identifier for the wireless client from the blockchain database. If a match is found, the device may retrieve the roaming information from the ledger for the client, such as by retrieving the keying or other FSR information regarding the client.

At step 820, the device may use, when available from the blockchain ledger, the roaming data regarding the wireless client to complete the association between the wireless client and the particular wireless access point, as described in greater detail above. For example, in the case in which the client is attempting to re-associate with the AP, the device can use the roaming information from the blockchain ledger to send a re-association response back to the client. In various embodiments, an existing FSR mechanism may also be leveraged in parallel with the blockchain-based roaming mechanism and whichever results in a re-association response faster may be used. In other cases, such as when the device is roaming between APs in separately administered networks (e.g., between different stores in a mall, etc.), the retrieved roaming information can be used to authenticate the client across the networks. Security checks, such as ensuring that the client is not spoofing a MAC address of an existing client, can also be performed using the information from the ledger.

At step 825, as detailed above, the device may update the blockchain ledger with data regarding the association between the wireless client and the particular wireless access point. For example, the device may add a child block to the ledger, if the AP is a new AP to which the client associates, or may update the timestamp, etc. of an existing block, in the case of a previously-visited AP. Procedure 800 then ends at step 830.

It should be noted that while certain steps shown in FIGS. 7-8 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while the procedures shown in FIGS. 7-8 are described separately, certain steps from each procedure may be incorporated into each other procedure, and the procedures are not meant to be mutually exclusive.

The techniques described herein, therefore, allow for the integration of a blockchain as an alternate FSR technique within a wireless network. In further aspects, this allows the network to adapt to the specific capabilities and configurations of each wireless client/smart object in the network. Additionally, the blockchain-based roaming approach herein can be used in parallel with an existing FSR technique, to provide redundancy to the fast secure roaming in the network.

While there have been shown and described illustrative embodiments that provide for using a blockchain for optimized fast-secure roaming, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device, data regarding a wireless client attempting to form an association between the wireless client and a particular wireless access point in a network;
   forming, by the device, the association between the wireless client and the particular wireless access point by:
   querying, by the device, a blockchain ledger in a blockchain database for wireless roaming data regarding the wireless client, the roaming data regarding the wireless client comprising a roaming history of the wireless client that is indicative of wireless access points with which the wireless client has been associated, wherein the blockchain ledger uses a hashing mechanism to link blocks within the blockchain ledger, the blocks representing a roam activity of the wireless client in the network, using, by the device and when available from the blockchain ledger, the roaming data regarding the wireless client to complete the association between the wireless client and the particular wireless access point, and when the wireless client is roaming to the particular wireless access point from another wireless access point, authenticating, by the device, the wireless client based on whether an association between the wireless client and the particular wireless access point is listed in the blockchain ledger using the roaming history of the wireless client queried from the blockchain ledger;

updating, by the device, the blockchain ledger with data regarding the association between the wireless client and the particular wireless access point;

determining, by the device, whether the wireless client is active based on a timer mechanism associated with the blockchain ledger, wherein the timer mechanism is reset when the blockchain ledger is updated with a new block that is indicative of a new roaming event; and when the timer mechanism associated with the blockchain ledger has expired, removing, by the device, the blockchain ledger from the blockchain database.

2. The method as in claim 1, wherein the wireless roaming data regarding the wireless client comprises a master session key (MSK).

3. The method as in claim 1, wherein updating the data regarding the association between the wireless client and the particular wireless access point comprises:

adding, by the device, a child block to the blockchain ledger, wherein the child block indicates the media access control (MAC) address of the wireless client, a basic service set identification (BSSID) of the particular wireless access point, and a timestamp regarding the association between the wireless client and the particular wireless access point.

4. The method as in claim 1, wherein the device comprises a controller for the particular wireless access point.

5. The method as in claim 1, wherein the roaming data regarding the wireless client from the blockchain ledger comprises data regarding an association between the wireless client and a wireless access point located in a second network that is administered separately from that of the network in which the particular wireless access point is located.

6. The method as in claim 1, further comprising:
using, by the device, the blockchain ledger to determine whether the wireless client is attempting to perform media access control (MAC) address spoofing.

7. The method as in claim 1, further comprising:
receiving, at the device, data regarding a second wireless client attempting to form an association between the second wireless client and the particular wireless access point in the network; and adding, by the device, a new blockchain ledger to the blockchain database regarding the association between the second wireless client and the particular wireless access point, when the blockchain database does not already store roaming data regarding the second wireless client.

8. The method as in claim 1, further comprising:
using the roaming data regarding the wireless client to make a security assessment of the wireless client.

9. An apparatus, comprising:
one or more network interfaces to communicate with a network;
a processor coupled to the network interfaces and configured to execute one or more processes; and
a memory configured to store a process executable by the processor, the process when executed configured to:
receive data regarding a wireless client attempting to form an association between the wireless client and a particular wireless access point in a network during an association phase;
form the association between the wireless client and the particular wireless access point by:
querying a blockchain ledger in a blockchain database for wireless roaming data regarding the wireless client, the roaming data regarding the wireless client comprising a roaming history of the wireless client that is indicative of wireless access points with which the wireless client has been associated, wherein the blockchain ledger uses a hashing mechanism to link blocks within the blockchain ledger, the blocks representing a roam activity of the wireless client in the network,
using, when available from the blockchain ledger, the roaming data regarding the wireless client to complete the association between the wireless client and the particular wireless access point, and
when the wireless client is roaming to the particular wireless access point from another wireless access point, authenticating the wireless client based on whether an association between the wireless client and the particular wireless access point is listed in the blockchain ledger using the roaming history of the wireless client queried from the blockchain ledger;
update the blockchain ledger with data regarding the association between the wireless client and the particular wireless access point, wherein the blockchain ledger is a blockchain database of client roam activity of the wireless client in the network;
determine whether the wireless client is active based on a timer mechanism associated with the blockchain ledger, wherein the timer mechanism is reset when the blockchain ledger is updated with a new block that is indicative of a new roaming event; and
when the timer mechanism associated with the blockchain ledger has expired, remove the blockchain ledger from the blockchain database.

10. The apparatus as in claim 9, wherein the wireless roaming data regarding the wireless client comprises a master session key (MSK).

11. The apparatus as in claim 9, wherein the apparatus updates the data regarding the association between the wireless client and the particular wireless access point by:
adding a child block to the blockchain ledger, wherein the child block indicates the media access control (MAC) address of the wireless client, a basic service set identification (BSSID) of the particular wireless access point, and a timestamp regarding the association between the wireless client and the particular wireless access point.

12. The apparatus as in claim 9, wherein the apparatus comprises a controller for the particular wireless access point.

13. The apparatus as in claim 9, wherein the roaming data regarding the wireless client from the blockchain ledger comprises data regarding an association between the wireless client and a wireless access point located in a second network that is administered separately from that of the network in which the particular wireless access point is located.

14. The apparatus as in claim 9, wherein the process when executed is further configured to:
use the blockchain ledger to determine whether the wireless client is attempting to perform media access control (MAC) address spoofing.

15. The apparatus as in claim 9, wherein the process when executed is further configured to:
receive data regarding a second wireless client attempting to form an association between the second wireless client and the particular wireless access point in the network; and
add a new blockchain ledger to the blockchain database regarding the association between the second wireless client and the particular wireless access point, when the blockchain database does not already store roaming data regarding the second wireless client.

16. The apparatus as in claim 9, wherein the process when executed is further configured to:
use the roaming data regarding the wireless client to make a security assessment of the wireless client.

17. The apparatus as in claim 9, wherein the blockchain ledger comprises at least one of: a pairwise master key (PMK), a group master key (GMK), a pairwise transient key (PTK), a group temporal key (GTK), fast transition (FT) data, robust security network information exchange (RSNIE) data, mobility domain information element (MDIE) data, or fast base substation system transitional information element (FTIE) data.

18. A tangible, non-transitory, computer-readable medium storing program instructions that cause a device to execute a process comprising:
receiving, at the device, data regarding a wireless client attempting to form an association between the wireless client and a particular wireless access point in a network during an 802.11 association phase;
forming, by the device, the association between the wireless client and the particular wireless access point by:
querying, by the device, a blockchain ledger in a blockchain database for wireless roaming data regarding the wireless client, the roaming data regarding the wireless client comprising a roaming history of the wireless client that is indicative of wireless access points with which the wireless client has been associated, wherein the blockchain ledger uses a hashing mechanism to link blocks within the blockchain ledger, the blocks representing a roam activity of the wireless client in the network,
using, by the device and when available from the blockchain ledger, the roaming data regarding the wireless client to complete the association between the wireless client and the particular wireless access point, and
when the wireless client is roaming to the particular wireless access point from another wireless access point, authenticating, by the device, the wireless client based on whether an association between the wireless client and the particular wireless access point is listed in the blockchain ledger using the roaming history of the wireless client queried from the blockchain ledger;
updating, by the device, the blockchain ledger with data regarding the association between the wireless client and the particular wireless access point;
determining, by the device, whether the wireless client is active based on a timer mechanism associated with the blockchain ledger, wherein the timer mechanism is reset when the blockchain ledger is updated with a new block that is indicative of a new roaming event; and
when the timer mechanism associated with the blockchain ledger has expired, removing, by the device, the blockchain ledger from the blockchain database.

* * * * *

UNITED STATES PATENT AND TRADEMARK OFFICE
CERTIFICATE OF CORRECTION

| | |
|---|---|
| PATENT NO. | : 11,122,500 B2 |
| APPLICATION NO. | : 15/872081 |
| DATED | : September 14, 2021 |
| INVENTOR(S) | : Gonzalo Salgueiro et al. |

It is certified that error appears in the above-identified patent and that said Letters Patent is hereby corrected as shown below:

In the Specification

Column 8, Line 26, please amend as shown:
ments. Like conventional blocks in a blockchain architecture, Column 10, Line 16, please amend as shown:
example, 802.11r distributes MSK, R0KH-ID and R1KH Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*